US012146039B2

(12) United States Patent
Takaiwa et al.

(10) Patent No.: US 12,146,039 B2
(45) Date of Patent: Nov. 19, 2024

(54) RESIN COMPOSITION FOR CARBON FIBER COMPOSITE MATERIAL, TOWPREG

(71) Applicant: Toray Industries, Inc., Tokyo (JP)

(72) Inventors: Reo Takaiwa, Pau (FR); Ichiro Taketa, Ehime (JP)

(73) Assignee: Toray Industries, Inc., Tokyo (JP)

( * ) Notice: Subject to any disclaimer, the term of this patent is extended or adjusted under 35 U.S.C. 154(b) by 603 days.

(21) Appl. No.: 17/424,657

(22) PCT Filed: Dec. 19, 2019

(86) PCT No.: PCT/IB2019/001382
§ 371 (c)(1),
(2) Date: Jul. 21, 2021

(87) PCT Pub. No.: WO2020/161515
PCT Pub. Date: Aug. 13, 2020

(65) Prior Publication Data
US 2022/0119607 A1 Apr. 21, 2022

(30) Foreign Application Priority Data

Feb. 8, 2019 (EP) .................... 19305156

(51) Int. Cl.
*C08J 5/24* (2006.01)
*C08J 3/24* (2006.01)
*C08L 63/00* (2006.01)

(52) U.S. Cl.
CPC ............... *C08J 5/249* (2021.05); *C08J 3/242* (2013.01); *C08J 5/243* (2021.05); *C08L 63/00* (2013.01); *C08J 2363/00* (2013.01); *C08J 2481/06* (2013.01)

(58) Field of Classification Search
None
See application file for complete search history.

(56) References Cited

U.S. PATENT DOCUMENTS

| 6,045,898 | A | 4/2000 | Kishi et al. |
| 6,429,157 | B1 | 8/2002 | Kishi et al. |
| 7,611,601 | B2 | 11/2009 | Nelson et al. |
| 2018/0100043 | A1 | 4/2018 | Takashima et al. |
| 2018/0134837 | A1 | 5/2018 | Furukawa et al. |
| 2019/0249002 | A1* | 8/2019 | Takahashi ............ C08G 59/245 |

FOREIGN PATENT DOCUMENTS

| JP | 09255800 A | 9/1997 |
| JP | 10330513 A | 12/1998 |
| JP | 2008031193 A | 2/2008 |
| JP | 2008517810 A | 5/2008 |
| JP | 2011157491 A | 8/2011 |
| JP | 2015193713 A | 11/2015 |
| JP | 2016044246 A | 4/2016 |
| WO | WO 2018021146 | * 2/2018 |

OTHER PUBLICATIONS

International Search Report and Written Opinion for International Application No. PCT/IB2019/001382, dated Apr. 7, 2020, 10 pages.

* cited by examiner

*Primary Examiner* — Robert T Butcher
(74) *Attorney, Agent, or Firm* — Buchanan Ingersoll & Rooney PC

(57) ABSTRACT

A towpreg that is easy to unwind from a bobbin, has good width accuracy after unwinding and can produce a composite material with excellent heat resistance, and a resin composition that gives such a towpreg.

A towpreg is characterized by being impregnated with an epoxy resin that contains an epoxy resin which is solid at 23° C. in an amount of 30 parts or more in 100 parts by mass of total epoxy resin components, contains a polyfunctional amine type epoxy resin which is liquid at 23° C. in an amount of 20 parts or more in 100 parts by mass of total epoxy resin components, and further contains a clay mineral.

19 Claims, No Drawings

RESIN COMPOSITION FOR CARBON FIBER COMPOSITE MATERIAL, TOWPREG

CROSS REFERENCE TO RELATED APPLICATIONS

This is the U.S. National Phase application of PCT/IB2019/001382, filed Dec. 19, 2019 which claims priority to European Patent Application No. 19305156.2, filed Feb. 8, 2019, the disclosures of each of these applications being incorporated herein by reference in their entireties for all purposes.

FIELD OF THE INVENTION

The present invention relates to a towpreg that has excellent unwinding performance from a bobbin and width accuracy after being unwound and gives an excellent heat resistant composite material, and a resin composition that gives such a towpreg.

BACKGROUND OF THE INVENTION

In production of fiber-reinforced composite materials, a prepreg is often used which is an intermediate material in which a reinforcing fiber aligned in one direction or a sheet-shaped material such as a woven fabric or a nonwoven fabric is impregnated with a thermosetting resin. On the other hand, besides a sheet-shaped prepreg, there is a narrow intermediate material called a tow prepreg, a towpreg, yarn prepreg, or strand prepreg, in which a reinforcing fiber bundle including thousands to tens of thousands of filaments arranged in one direction is impregnated with a thermosetting resin.

Examples of a method of laminating the intermediate material include a hand lay-up method, an Automated Tape Laying (ATL) method, an Automated Fiber Placement (AFP) method, and the like. However, in the case of producing a large-sized composite material like aircraft, automatic lamination methods such as ATL method and AFP method are used (see, for example, Patent Literature 1) because a drastic improvement in productivity is possible. Among them, the AFP method adopts a technique of laminating a slit tape prepreg obtained by cutting a prepreg into a tape shape in a fiber direction. This method is suitable for manufacturing parts having relatively many curved surfaces such as an aircraft fuselage, and can minimize defects during molding, so that it becomes a method that is recently often used.

In the automatic lamination method, after the reinforcing fiber bundle is impregnated with the thermosetting resin in the production process, the intermediate material is once wound on a bobbin. Next, in the production process of the fiber-reinforced composite material, the tow prepreg wound on the bobbin is unwound and used. When the intermediate material adheres each other at unwinding, fuzz and fiber bridging occur due to resistance in separating between the adhered intermediate material, and the quality of the intermediate material is remarkably deteriorated, so that it is required that the intermediate materials wound on the bobbins is prevented from adhesion.

When an overlap of position of the intermediate material occurs during lamination by a machine, mechanical properties after a laminate is cured are greatly reduced, so that it is also important for the intermediate material to have high width accuracy. In addition to these properties, the intermediate material is required to have high heat resistance for use in aviation applications.

Patent Literature 2 discloses a towpreg having excellent unwinding performance by using a resin having a low viscosity. Meanwhile, when a low viscosity resin is used, it is difficult to maintain the shape of a towpreg, and it is impossible to achieve width accuracy which is essential for automatic lamination.

PATENT LITERATURE

Patent Literature 1: JP 2008-517810 T
Patent Literature 2: JP 2011-157491 A

SUMMARY OF THE INVENTION

The present invention improves the disadvantages of the prior art and relates to a towpreg that has excellent unwinding performance from a bobbin and width accuracy after being unwound and gives an excellent heat resistant composite material, and a resin composition that gives such a towpreg.

The present invention adopts the following means in order to solve the problems. That is, the towpreg according to embodiments of the present invention is a towpreg impregnated with an epoxy resin composition containing the following components [A] to [C],

[A] an epoxy resin which is solid at 23° C. in an amount of 30 parts or more in 100 parts by mass of total epoxy resin components, [B] a polyfunctional amine type epoxy resin which is liquid at 23° C. in an amount of 20 parts or more in 100 parts by mass of total epoxy resin components, and [C] a clay mineral as inorganic particles.

The invention also relates to a fiber-reinforced composite material obtained by heating and curing a towpreg of the invention.

The invention also relates to a manufactured article comprising or made of one or more fiber-reinforced composite material according to the invention. For example, said manufactured article is a composite material for the aerospace applications or aeronautic industry such as for an aircraft, typically an aircraft fuselage.

According to embodiments of the present invention, the resin composition impregnated in the towpreg has a high storage modulus at a room temperature of 23° C., and the resin exhibits thixotropy, so that the fluidity of the resin during storage is extremely low. Even when the towpreg is wound around the bobbin and then stored for a long period of time, the towpreg is prevented from adhesion and exhibits good unwinding performance. Further, the shape of towpreg is difficult to deform even when pressure is applied on the outside surface of the towpreg due to a winding tension during production and the towpreg is pressed against the bobbin. Therefore, even when the towpreg wound on the bobbin is unwound at high speed, fuzz and fiber bridging hardly occur and the towpreg is easily unwound, and a state after the towpreg is unwound is excellent. Such high speed is for example more than 10 m/min. Furthermore, since the width of the towpreg does not fluctuate when the bobbin is stored and the width accuracy is not disturbed during the towpreg is unwound, the width accuracy after the towpreg is unwound is also good.

DETAILED DESCRIPTION OF EMBODIMENTS OF THE INVENTION (Towpreg)

The towpreg of the present invention refers to a narrow intermediate material obtained by impregnating a reinforcing fiber bundle (tow) in which thousands to tens of thousands of filaments are arranged in one direction with a thermosetting resin. Narrow for towpreg means a dimension of less than or equal to 2.0 in, preferably less than or equal to 1.0 in, more preferably less than or equal to 0.5 in. When the above range of the width is satisfied, the towpreg have high fiber areal weight and it could shorten effectively molding cycle time.

The towpreg of the present invention preferably satisfies that [T1] a tension is 5.0 N or less required when a sample obtained by winding 1.2 m of the towpreg on a bobbin having an outer diameter of 8.25 cm under a load of 9.8 N over 30 seconds is stored in an environment of 23° C./50 RH % for 5 days, and then unwound at 1.0 m/min. The tension is more preferably 3.0 N or less. When it is larger than 5.0 N, high resistance occurs when the towpreg is unwound at high speed, so that the towpreg is difficult to be unwound, a large amount of fuzz and fiber bridging is generated on the surface of the towpreg, and the surface state after the unwinding also deteriorates. Further, the towpreg is deformed by the tension during the unwinding, and the width accuracy of the towpreg after the unwinding also deteriorates.

The tension required for the unwinding as used herein refers to a load when the bobbin is unwound at 1.0 m/min using universal testing machine (for example, Instron Universal Testing Machine: manufactured by Instron).

Also, in the towpreg according to embodiments of the present invention, [T2] an extension of width of the towpreg is 3.0% or less when a sample in which the towpreg cut into 7.6 cm length is inserted between two of 2.6 cm×7.6 cm glass plate is stored in an environment of 23° C./50 RH % for 2 days in a state where a pressure of 2.48×10³ Pa is applied to the glass plates in thickness direction. When the extension of width is larger than 3.0%, the shape of the towpreg tends to change due to a winding tension when the towpreg is wound on the bobbin and the resistance during the unwinding, and the width accuracy of the towpreg after the towpreg is unwound at high speed deteriorates. Furthermore, large width fluctuation causes abrasion at an end of the towpreg during the unwinding, so that fuzz is generated. Accordingly, the state of the surface after the unwinding also deteriorates.

The extension of width of the towpreg as used herein refers to a value calculated, using the following formula (1), from values obtained by measuring the width of the towpreg before and after storage with use of an optical microscope (for example, VHX-500F: manufactured by KEYENCE CORPORATION).

$$\text{(Width of Towpreg after Storage/Width of Towpreg Before Storage}-1)\times 100 \quad \text{Formula (1)}$$

Furthermore, in the towpreg according to embodiments of the present invention, [T3] a glass transition temperature, when the towpreg is cured at a temperature of 180° C. or more for 2 hours, is 180° C. or more. The glass transition temperature is further preferably 200° C. or more. When the towpreg exhibits a glass transition temperature of 180° C. or more, it can be preferably used in aerospace applications requiring high heat resistance.

The glass transition temperature as used herein refers to the onset temperature of storage modulus, when the storage modulus of a Carbon Fiber Reinforced Polymer (CFRP) that has a thickness of 2 mm and that is obtained by laminating towpregs and curing the towpregs at 180° C. for 2 hours is measured using a dynamic viscoelasticity measuring device (for example, DISCOVERY HR-2: manufactured by TA Instruments) in a cantilever bending mode at a frequency of 1 Hz at a temperature rising rate of 5° C./min.

(Epoxy Resin Composition)

In addition, in the epoxy resin composition contained in the towpreg according to embodiments of the present invention, [R1] a thixotropy coefficient ($\eta^*_{0.1\,Hz}/\eta^*_{10\,Hz}$) at 60° C. is 3.0 or more. When the thixotropy coefficient is less than 3.0, the resin flows in the case of storing the towpreg in a state where the towpreg is wound on the bobbin for a long term, and the towpreg adheres, so that the unwinding performance when the towpreg is unwound at high speed deteriorate. The thixotropy coefficient is more preferably 4.0 or more.

The thixotropy coefficient at 60° C. as used herein is defined as a value calculated, using the following formula (2), from values obtained by measuring viscosities in a torsional mode at frequencies of 0.1 Hz and 10 Hz at a temperature of 60° C. with use of a dynamic viscoelasticity measuring device (for example, DISCOVERY HR-2: manufactured by TA Instruments).

$$\text{Viscosity at 0.1 Hz } (\eta^*_{0.1\,Hz})/\text{Viscosity at 10 Hz } (\eta^*_{10\,Hz}) \quad \text{Formula (2)}$$

In addition, in the epoxy resin composition contained in the towpreg according to embodiments of the present invention, [R2] a storage modulus at 1 Hz at 23° C. is $2.0\times10^5$ Pa or more. More preferably $2.0\times10^5$ Pa-$6.0\times10^6$ Pa. When the storage modulus is less than $2.0\times10^5$ Pa, it is difficult to keep shape of a towpreg and the width accuracy after the towpreg is unwound at high speed deteriorates. The storage modulus is further preferably $3.0\times10^5$ Pa or more.

The storage modulus of the resin composition as used herein refers to a value measured using a dynamic viscoelasticity measuring device (for example, DISCOVERY HR-2: manufactured by TA Instruments) in a torsional mode at a frequency of 1 Hz at a temperature of 23° C.

Furthermore, in the epoxy resin composition contained in the towpreg according to embodiments of the present invention, [R3] a glass transition temperature when the epoxy resin composition is cured at a temperature of 180° C. or more for 2 hours is 180° C. or more. When the towpreg exhibits a glass transition temperature of 180° C. or more, it can be preferably applied to aerospace applications requiring high heat resistance. The glass transition temperature is further preferably 200° C. or more.

The glass transition temperature as used herein refers to the onset temperature of storage modulus when a temperature of a sample cured at a temperature of 180° C. for 2 hours is measured in a torsional mode at a frequency of 1.64 Hz at a temperature rising rate of 5° C./min with use of a dynamic viscoelasticity measuring device (for example, ATD-3000: manufactured by Alpha Technologies).

The structure of the epoxy resin contained in the towpreg of the present invention is not particularly limited, and for example, a bisphenol type epoxy resin, a phenol novolac type epoxy resin, a cresol novolac type epoxy resin, a phenol aralkyl type epoxy resin, a biphenyl type epoxy resin, a bisnaphthalene type epoxy resin, a dicyclopentadiene type epoxy resin, a tetraphenylethane type epoxy resin, a triphenyl methane type epoxy resin, a glycidyl amine type epoxy resin, an amino phenol type epoxy resin or the like can be used.

The epoxy resin composition contained in the towpreg according to embodiments of the present invention essentially contains an epoxy resin which is solid at a room temperature of 23° C. in an amount of 30 parts or more in 100 parts by mass of the epoxy resin. The amount is more preferably 40 parts or more. When the above range is satisfied, a resin composition having good storage modulus at 1 Hz at a room temperature of 23° C. can be obtained and also a towpreg having good impregnation can be obtained.

Further, [A] the epoxy resin composition contained in the towpreg according to embodiments of the present invention essentially contains an epoxy resin which is solid at a room temperature of 23° C. in an amount of 30 parts or more in 100 parts by mass of the epoxy resin. More preferably 40 parts or more. When the above range is satisfied, preferable level of both storage modulus at 23° C. and impregnation performance can be obtained.

Also the epoxy resin composition contained in the towpreg of the present invention preferably contains an epoxy resin which has an epoxy equivalent weight of 300 g/eq or less in an amount of 20 parts or more among solid state epoxy. When the above range is satisfied, a towpreg having good impregnation performance and good surface quality can be obtained.

Also, [B] the epoxy resin composition contained in the towpreg according to embodiments of the present invention essentially contains polyfunctional amine type epoxy resin which is liquid at 23° C. in an amount of 20 parts or more in 100 parts by mass of the epoxy resin. When the above range is satisfied, a resin composition having good heat resistance after being cured is obtained. Also an epoxy resin have good dispersion of particle such as a hardener and an inorganic particle by containing the poly functional amine type epoxy resin and a towpreg having good width accuracy can be obtained because the epoxy resin suppresses waving towpreg for impregnation.

By using the epoxy resin which is solid at a room temperature of 23° C. and has an epoxy equivalent weight of 300 g/eq or less in combination with the polyfunctional amine type epoxy resin which is liquid at 23° C., an epoxy resin composition having better heat resistance after being cured is obtained.

As a commercial product of bisphenol type epoxy resin which is solid at room temperature, "jER (registered trademark)" 1001, 1004, 1007, 4004P, 4007P (manufactured by Mitsubishi Chemical Corporation), "Araldite (registered trademark)" GT7071, GT6084-2 (manufactured by Huntsman Corporation) or the like can be used.

As a commercial product of the epoxy resin which is solid at room temperature and has an epoxy equivalent weight of 300 g/eq or less, "EPICLON (registered trademark)" N-660, N-665, N-695 (manufactured by DIC Corporation) or the like can be used as a cresol novolac type epoxy resin; NC-3000, NC-3000L (manufactured by Nippon Kayaku Co., Ltd.) or the like can be used as a phenol aralkyl type epoxy resin; "EPICLON (registered trademark)" HP-4700, HP-4710, HP-4770 (manufactured by DIC Corporation) or the like can be used as a bisnaphthalene type epoxy resin; "EPICLON (registered trademark)" HP-7200, HP-7200H (manufactured by DIC Corporation), Tactix556 (manufactured by Huntsman Corporation) or the like can be used as a dicyclopentadiene type epoxy resin.

These epoxy resins which are solid at room temperature may be added not only in one type but also in combination of plural types.

As a commercial product of the polyfunctional amine type epoxy resin which is liquid at 23° C., "SUMIEPOXY (registered trademark)" ELM434 (manufactured by Sumitomo Chemical Co., Ltd.), "Araldite (registered trademark)" MY720, MY721 (manufactured by Huntsman Corporation) or the like can be used as a glycidyl amine type epoxy resin; "SUMIEPOXY (registered trademark)" ELM100, ELM120 (manufactured by Sumitomo chemical Co., Ltd.), "Araldite (registered trademark)" MY0500, MY0510, MY0600 (manufactured by Huntsman Corporation), "jER (registered trademark)" 630 (manufactured by Mitsubishi Chemical Corporation) or the like can be used as an amino phenol type epoxy resin.

Examples of the curing agent of the epoxy resin composition contained in the towpreg according to embodiments of the present invention include a single or mixed system of aromatic amines, dicyandiamide, adipic acid dihydrazide. Examples of the aromatic amines include meta-phenylenediamine, diaminodiphenylmethane, diaminodiphenylsulfone, meta-xylene diamine, and the like.

These curing agents may be used alone or in combination as appropriate. The aromatic amines are particularly preferable because they can impart heat resistance to a resin cured product. From the viewpoint of imparting heat resistance, the aromatic amines are preferably added in an epoxy equivalent ratio, which is molar ratio of an epoxy group of the epoxy resin to active hydrogens of the aromatic amines, of 0.7 to 1.2.

It is necessary for the epoxy resin composition to contain an inorganic particle for imparting thixotropy to the resin composition and unwinding performance when formed into a towpreg. As the shape of the inorganic particle, rod, tube and plate shape are preferably used. [C] A clay mineral is more preferable in the above inorganic particle. As the clay minerals, "Garamite (registered trademark)"-1958, -7305 (manufactured by BYK Additives & Instruments) or the like can be used as organophilic phyllosilicates can be used. The epoxy resin composition contains a clay mineral as inorganic particles, whereby the resin composition obtains thixotropy, and exhibits excellent unwinding performance when formed into a towpreg with maintaining good impregnation and good width accuracy of towpreg.

Also, a thermoplastic resin component can be blended in the epoxy resin composition contained in the towpreg according to embodiments of the present invention as long as the effect of the present invention is not impaired. Specific examples thereof include polyacetal resins, polyvinyl formal, polymethylmethacrylate, polyamide, polyimide, polyvinylpyrrolidone, polysulfone, and the like. Among them, polysulfone and polyimide are preferable because the resin itself is excellent in heat resistance, and polyether sulfone is particularly preferable. When polyether sulfone has a weight average molecular weight of 30,000 g/mol or less, it is preferred because impregnation properties into the towpreg of the resin are improved.

An example of a commercial product of the polyether sulfone includes "SUMIKAEXCEL (registered trademark)" PES (manufactured by Sumitomo Chemical Co., Ltd.), and an example of a commercial product of the polyimide includes "Matrimid5218 (manufactured by Huntsman Corporation)", and the like.

(Method for Producing Epoxy Resin Composition)

In preparing the epoxy resin composition according to embodiments of the present invention, for example, raw materials may be kneaded using a machine such as a kneader, a planetary mixer, a three-roll or twin screw extruder, or raw materials may be mixed by hand using a beaker, a spatula and the like as long as uniform kneading is possible.

(Fiber-Reinforced Composite Material)

Next, a fiber-reinforced composite material will be described. A fiber-reinforced composite material can be obtained by heating and curing the towpreg according to embodiments of the present invention. The reinforcing fiber used in the present invention is not particularly limited, and glass fiber, carbon fiber, aramid fiber, boron fiber, alumina fiber, silicon carbide fiber and the like are used.

Only one type of these fibers may be used, or two or more types thereof may be mixed and used. Among them, it is preferable to use carbon fibers from the viewpoint of obtaining a lightweight and highly elastic fiber-reinforced composite material.

EXAMPLES

Hereinafter, the present invention will be described in more detail with reference to examples, but the present invention is not limited to the description of these examples. Unless otherwise specified, measurements of various physical properties were performed in an environment at a temperature of 23° C. and a relative humidity of 50%.

The materials used to prepare each towpreg are as follows.

<Materials Used>

(Epoxy Resins Liquid at Room Temperature of 23° C.)
  "Araldite (registered trademark)" LY1556 (bisphenol type epoxy resin, epoxy equivalent: weight 187 g/eq, manufactured by Huntsman Corporation)
  "Araldite (registered trademark)" GY282 (bisphenol type epoxy resin, epoxy equivalent: weight 167 g/eq, manufactured by Huntsman Corporation)

(Polyfunctional Amine Type Epoxy Resin which is Liquid at 23° C.)
  "Araldite (registered trademark)" MY0510 (aminophenol type epoxy resin, epoxy equivalent weight: 96 g/eq, manufactured by Huntsman Corporation)
  "Araldite (registered trademark)" MY721 (glycidyl amine type epoxy resin, epoxy equivalent weight: 115 g/eq, manufactured by Huntsman Corporation)

(Epoxy Resins Solid at Room Temperature of 23° C.)
  "Araldite (registered trademark)" GT7071 (bisphenol type epoxy resin, epoxy equivalent weight: 490 g/eq, manufactured by Huntsman Corporation)
  "Araldite (registered trademark)" GT6084-2 (bisphenol type epoxy resin, epoxy equivalent weight: 862 g/eq, manufactured by Huntsman Corporation)
  "EPICLON (registered trademark)" HP4710 (bisnaphthalene type epoxy resin, epoxy equivalent weight: 172 g/eq, manufactured by DIC Corporation)
  "EPICLON (registered trademark)" HP7200L (dicyclopentadiene type epoxy resin, epoxy equivalent weight: 247 g/eq, manufactured by DIC Corporation)

(Curing Agent)
  "Aradur (registered trademark)" 9664-1 (4,4'-diaminodiphenylsulfone, manufactured by Huntsman Corporation)
  "Aradur (registered trademark)" 9771-1 (3,3'-diaminodiphenylsulfone, manufactured by Huntsman Corporation)

(Inorganic Particles)

(1) Clay Mineral
  "Garamite (registered trademark)"-7305 (organophilic phyllosilicates, manufactured by BYK Additives & Instruments)
  "Garamite (registered trademark)"-1958 (organophilic phyllosilicates, manufactured by BYK Additives & Instruments)

(2) Fumed Silica
  "AEROSIL (registered trademark)" R 202 (Fumed silica, manufactured by Evonik)

Typically, the towpreg composition comprises between 1 and 10% of inorganic particles for 100 parts of epoxy resin composition.

(Thermoplastic Resin)
  "SUMIKAEXCEL (registered trademark)" PES 2603MP, (polyether sulfone, weight average molecular weight of 16,000 g/mol, manufactured by Sumitomo Chemical Co., Ltd.)

Typically, the towpreg composition comprises between 1 and 20% of thermoplastic resin for 100 parts of epoxy resin composition.

(Reinforcing Fiber)
  "Torayca (registered trademark)" T700G-12K (carbon fiber, manufactured by Toray Carbon Fibers Europe)

<Method for Preparing Epoxy Resin Composition>

Predetermined amounts of compositions except a curing agent and inorganic particles from the epoxy resin composition was placed in a kneader, and the mixture was heated and kneaded to obtain a transparent viscous liquid.

After the temperature of the viscous liquid was lowered while kneading, the curing agent and the inorganic particles were added, and the mixture was kneaded to obtain an epoxy resin composition.

The compositions of the epoxy resin compositions of Examples and Comparative Examples are shown in Table 1.

<Method for Measuring Properties of Epoxy Resin Composition>

(1) Method for Measuring Storage Modulus of Epoxy Resin Composition at Room Temperature of 23° C.

Using a dynamic viscoelasticity measuring device (DISCOVERY HR-2: manufactured by TA Instruments) and a parallel plate with a diameter of 8 mm, an uncured resin composition was set so that the distance between upper and lower jigs was 500 μm, and storage modulus was measured in a torsional mode at a frequency of 1 Hz at a temperature of 23° C.

(2) Method for Measuring Thixotropy Coefficient of Epoxy Resin Composition at 60° C.

Using a dynamic viscoelasticity measuring device (DISCOVERY HR-2: manufactured by TA Instruments) and a parallel plate with a diameter of 25 mm, an uncured resin composition was set so that the distance between upper and lower jigs was 500 μm, and viscosity was measured in a torsional mode at frequencies of 0.1 Hz and 10 Hz at a temperature of 60° C. The thixotropy coefficient can be calculated from the obtained viscosity by the following formula (3).

$$\text{Viscosity at 0.1 Hz } (\eta^*_{0.1\,Hz})/\text{Viscosity at 10 Hz } (\eta^*_{10\,Hz}) \qquad \text{Formula (3)}$$

<Method for Measuring Glass Transition Temperature of Epoxy Resin Cured Product>

An uncured epoxy resin composition defoamed in vacuum was heated at 2.0° C./min using a dynamic viscoelasticity measuring device (ATD-3000: manufactured by Alpha Technologies) and cured at a temperature of 180° C.

for 2 hours, then the temperature was raised at a temperature rising rate of 5° C./min, and storage modulus was measured in a torsional mode at a frequency of 1.64 Hz. The onset temperature of the storage modulus at this time was defined as a glass transition temperature.

<Method for Preparing Towpreg>

Various epoxy resin compositions prepared using the composition of Table 1 were impregnated into a reinforcing fiber bundle by a pultrusion molding method by the following method to prepare a towpreg.

Specifically, the reinforcing fiber bundle is passed through a tow prepreg manufacturing apparatus equipped with a creel for feeding reinforcing fibers, a resin bath for impregnating an epoxy resin, a slit die for shaping at a resin bath outlet, a drive station with a chiller and a winder, to make a yarn path. The epoxy resin composition was separately adjusted to a temperature of 80° C. in a hot air oven and supplied to a resin bath also adjusted to a temperature of 80° C. The reinforcing fiber is passed through the resin bath to supply the epoxy resin composition and then passed through the die to adjust the resin content.

Finally, after passing through a drive station cooled to 20° C. or less, it was taken up by a winder to form a bobbin of towpreg. In addition, when winding up with a winder, in order to prevent adhesion between the towpreg, a back film was supplied together with the towpreg as necessary. Winding was carried out on the towpreg in both cases of with and without the back film.

The line speed at the time of making the towpreg was 1 m/min, the winding line tension was 12 N or less, and the resin content was adjusted so as to be 34% by weight.

<Evaluation Method of Properties of Towpreg>

(1) Evaluation of State after High-Speed Unwinding of Towpreg

The bobbin of the towpreg wound on the bobbin without back film, obtained in each example and comparative example, was allowed to stand for 30 minutes or more under an environment of a temperature of 23° C.±5° C. and a relative humidity of 60%±20%, and set on the creel, and the towpreg was unwound at 20 m/min using a winder, then the state of towpreg was evaluated. A case where unwinding performance were good, and fuzz and a fiber bridging did not occur after unwinding was determined as A, a case where fuzz occurred after unwinding was determined as B, and a case where a large amount of fuzz and fiber bridgings occurred after unwinding and unwinding was difficult was determined as C.

(2) Width Accuracy Evaluation after High-Speed Unwinding of Towpreg

The bobbin of the towpreg wound on the bobbin without back film, obtained in each example and comparative example, was allowed to stand for 30 minutes or more under an environment of a temperature of 23° C.±5° C. and a relative humidity of 60%±20%, and set on the creel, and the towpreg was unwound by 18 m at 2 m/min using a winder, then the width of the obtained towpreg after unwinding was measured at 481 points at 3.75 cm intervals with a microscope (VHX-500F: manufactured by KEYENCE CORPORATION), and the standard error was defined as a width accuracy.

(3) Winding Test of Towpreg 1.2 m was separated from the towpreg wound on the bobbin with back film, obtained in each example and comparative example, and one end of the separated towpreg was fixed to the bobbin with an outside diameter of 8.25 cm with tape and a 1.0 kg weight was attached at the other end. Thereafter, the bobbin was attached to the creel so that the weight would float, and a towpreg without back film was wound on the bobbin over 30 seconds with the towpreg under a tension of 9.8 N to prepare a sample.

The sample was stored in an environment of a temperature 23° C.±5° C. and a relative humidity 50%±10% for 5 days, then set in the creel, and using an Instron universal testing machine (manufactured by Instron), a tension when unwound at a crosshead speed of 1.0 m/min was measured.

(4) Pressure Deformation Examination of Towpreg 7.6 cm was separated from the towpreg wound on the bobbin with back film, obtained in each example and comparative example, and the separated towpreg was inserted between two of 2.6 cm×7.6 cm glass plates to prepare a sample. The width of the towpreg in the sample was measured at 7 points at 1.0 cm intervals using a microscope (VHX-500F: manufactured by KEYENCE CORPORATION) (the average value of the width at this time is defined as $W_b$).

Next, a weight of 500 g were placed on the sample, and the glass plates were stored in a state that a pressure of $2.48 \times 10^3$ Pa was applied to the glass plates in an environment of a temperature of 23° C.±5° C. and a relative humidity of 50%±10% for 2 days, then the width of the towpreg in the sample was again measured at 7 points using the microscope (the average value of the width at this time is defined as Wa). Using the following formula (4), extendability of the width of the towpreg before and after applying pressure was calculated.

(Width $W_a$ of Towpreg after Storage/Width $W_b$ of Towpreg Before Storage−1)×100    Formula (4)

(5) Measurement Method of Glass Transition Temperature of Towpreg 25 cm was separated from the bobbin of the towpreg wound on the bobbin with back film, obtained in each example and comparative example, and the separated towpreg was laminated 8 plies on an aluminum plate and cured at a temperature of 180° C. for 2 hours to obtain a plate-like fiber-reinforced composite material with a thickness of 2 mm. From this fiber-reinforced composite material, a test piece with a width of 10 mm and a length of 35 mm was cut out, and storage modulus was measured using a dynamic viscoelasticity measuring device (for example, DISCOVERY HR-2: manufactured by TA Instruments), in a cantilever bending mode at a frequency of 1 Hz, by raising temperature at a temperature rising rate of 5° C./min. The onset temperature of the storage modulus at this time was defined as a glass transition temperature.

(6) Towpreg Surface Quality Observation

The bobbin of the towpreg just after production were used for towpreg surface quality observation. A case where surface quality were good, and fuzz and towpreg waving did not observed was determined as A, a case where small fuzz and small towpreg waving were observed was determined as B, and a case where a large amount of fuzz and large towpreg waving were observed was determined as C, and a case where a large amount of fuzz and carbon fiber breakage were observed was determined as D. So towpreg could not be produced in the D case.

Example 1

Using 50 parts by mass of "Araldite (registered trademark)" MY0510, and 50 parts by mass of "EPICLON (registered trademark)" HP4710 as epoxy resins, and using 45.9 parts of "Aradur (registered trademark)" 9664-1 as a curing agent, 10 parts by mass of "SUMIKAEXCEL (registered trademark)" PES 2603MP as a thermoplastic resin and 3 parts by mass of "Garamite (registered trademark)"-7305 as inorganic particles, an epoxy resin composition was prepared according to the above <Method for Preparing Epoxy Resin Composition>, then a towpreg with a resin content of 34% by weight was prepared according to the above <Method for Preparing Towpreg>.

A state and width accuracy after high-speed unwinding of the towpreg, a winding test, a pressure deformation examination, a glass transition temperature after curing at 180° C. for 2 hours, a thixotropy coefficient of the epoxy resin composition at 60° C., a storage modulus at 1 Hz at 23° C., and a glass transition temperature after curing at 180° C. for 2 hours were as shown in Table 1.

Examples 2 to 4

Epoxy resin compositions and towpreg with a resin content of 34% by weight were prepared in the same manner as in Example 1, except that the components and blending amounts of the epoxy resin compositions were changed as shown in Table 1, respectively.

With respect to the towpreg and epoxy resin composition of each example, a state and width accuracy after high-speed unwinding of the towpreg, a winding test, a pressure deformation examination, a glass transition temperature after curing at 180° C. for 2 hours, a thixotropy coefficient of the epoxy resin composition at 60° C., a storage modulus at 1 Hz at 23° C., and a glass transition temperature after curing at 180° C. for 2 hours were as shown in Table 1.

Comparative Example 1

Using the components shown in Comparative Example 1 of Table 1, an epoxy resin composition and a towpreg with a resin content of 34% by weight were prepared in the same manner as in Example 1. In Comparative Example 1, since the epoxy resin composition impregnated in the towpreg did not contain inorganic particles and the thixotropy coefficient at 60° C. was 1.3 that was 3.0 or less, the result of the winding test of towpreg was 5.8 N that was 5.0 N or more, resistance occurred when unwinding the towpreg at high speed, and a large amount of fuzz and fiber bridgings occurred. Therefore, the state after unwinding was poor, and the width accuracy after unwinding was also poor at 0.23.

Comparative Example 2

Using the components shown in Comparative Example 2 of Table 1, an epoxy resin composition and a towpreg with a resin content of 34% by weight were prepared in the same manner as in Example 1. In Comparative Example 2, no epoxy resin solid at room temperature was contained, the epoxy resin composition impregnated in the towpreg had storage modulus at 23° C. of $0.8 \times 10^5$ Pa that was $2.0 \times 10^5$ Pa or less, and the result of the pressure deformation examination of the towpreg was 6.0% that was 3.0% or more. Therefore, the width accuracy after unwinding the towpreg at high speed was poor.

Comparative Example 3

Using the components shown in Comparative Example 3 of Table 1, an epoxy resin composition and a towpreg with a resin content of 34% by weight were prepared in the same manner as in Example 1. In Comparative Example 3, since no epoxy resin solid at room temperature was contained, the epoxy resin could not achieve preferable level of both storage modulus at 23° C. and impregnation performance. Carbon fiber breakage happened during towpreg production due to high viscosity at impregnation temperature and towpreg could not be obtained.

Comparative Example 4

Using the components shown in Comparative Example 4 of Table 1, an epoxy resin composition and a towpreg with a resin content of 34% by weight were prepared in the same manner as in Example 1. In Comparative Example 4, since the epoxy resin did not contain polyfunctional amine type epoxy resin, the towpreg waving occurred during towpreg production, and the width accuracy after unwinding of the towpreg at high speed was poor.

Comparative Example 5

Using the components shown in Comparative Example 5 of Table 1, an epoxy resin composition and a towpreg with a resin content of 34% by weight were prepared in the same manner as in Example 1. In Comparative Example 5, since fused silica, not a clay mineral, was added as inorganic particles, the state when unwinding the towpreg at high speed was poor, and a large amount of fluff and fiber bridges occurred. Furthermore, the width accuracy after unwinding the towpreg at high speed was 0.24, which were also poor.

TABLE 1

| | | | Epoxy eq. [g/eq.] | Example 1 | Example 2 | Example 3 | Example 4 | Example 5 | Example 6 | Example 7 |
|---|---|---|---|---|---|---|---|---|---|---|
| Epoxy resin which is liquid at room temperature | Bisphenol type epoxy | LY1556 (Bisphenol A type epoxy resin) | 187 | — | 20 | 20 | 30 | 50 | — | 20 |
| | | GY282 (Bisphenol F type epoxy resin) | 167 | — | — | — | — | — | 20 | — |
| | [B] Polyfunctional amine type | MY0510 (Aminophenol type epoxy resin) | 96 | 50 | 40 | 40 | 30 | — | — | 40 |
| | | MY721 (Glycidyl amine type epoxy resin) | 115 | — | — | — | 10 | — | 30 | — |
| | | MY9665T (Glycidyl amine type epoxy resin) | 120 | — | — | — | — | 20 | — | — |
| [A] Epoxy resin which is solid at room temperature | EEW >300[g/eq] | GT7071 (Bisphenol type epoxy resin) | 490 | — | — | — | — | — | — | 20 |
| | | GT6084-2 (Bisphenol type epoxy resin) | 862 | — | 20 | — | — | — | — | 20 |
| | EEW ≤300[g/eq] | HP4710 (Bisnaphthalene type epoxy resin) | 173 | 50 | 20 | 40 | 30 | 30 | — | — |
| | | HP7200L (Dicyclopentadiene type epoxy resin) | 247 | — | — | — | — | — | 50 | — |

TABLE 1-continued

| | | | | | | | | | | |
|---|---|---|---|---|---|---|---|---|---|---|
| Thermoplastic resin | | PES 2603 MP (Polyether sulfone) | — | 10 | 10 | 10 | 10 | 3 | 14 | 10 |
| Inorganic particle | [C] Clay mineral | Garamite 7305 (Organophilic phyllosilicates) | — | 3 | 4 | 4 | 4 | — | — | 4 |
| | | Garamite 1958 (Organophilic phyllosilicates) | — | — | — | — | — | 4 | 4 | — |
| | Fumed silica | Aerosil RY200 (Fumed silica) | — | — | — | — | — | — | — | — |
| Curing agent | Aromatic amine | Aradur 9664-1 ([[4-4']]4,4'-diaminodiphenylsulfone) | — | 45.9 0.9eq | 37.5 0.9eq | 42.7 0.9eq | 41.5 0.9eq | 34.4 0.9eq | — | 33.3 0.9eq |
| | | Aradur 9771--1 ([[4-4']]3,3'-diaminodiphenylsulfone) | — | — | — | — | — | — | 33.1 0.9eq | — |
| High-speed unwinding performance | | Surface state after unwinding | — | B | B | A | B | B | A | B |
| | | Width accuracy after unwinding (standard deviation of width [mm]) | — | 0.15 | 0.10 | 0.09 | 0.17 | 0.19 | 0.08 | 0.10 |
| Towpreg properties | | Tension for winding test of towpreg [N] | — | 4.1 | 3.1 | 3.0 | 4.8 | 4.8 | 3.1 | 3.2 |
| | | Spreadability for pressure deformation examination of towpreg [%] | — | 1.5 | 0.6 | 1.1 | 1.8 | 1.2 | 0.2 | 1.0 |
| | | Grass transition temperature after cure180° C./2 h [° C.] | — | 216 | 200 | 212 | 212 | 202 | 182 | 163 |
| | | Surface quality of towpre just after production | — | A | B | A | A | A | A | C |
| Resin properties | | Thixotropy coefficient at 60° C. ($\eta^*_{0.1\,Hz}/\eta^*_{10\,Hz}$) | — | 3.3 | 5.2 | 5.3 | 5.1 | 5.0 | 4.0 | 5.0 |
| | | 1 Hz storage modulus at 23° C. [Pa] | — | 3.1 | 6.0 | 4.0 | 2.7 | 2.9 | 23.6 | 5.6 |
| | | Grass transition temperature after cure 180° C./2 h [° C.] | — | 220 | 204 | 215 | 218 | 207 | 187 | 168 |

| | | | Example 8 | Example 9 | Comparative example1 | Comparative example2 | Comparative example3 | Comparative example4 | Comparative example5 |
|---|---|---|---|---|---|---|---|---|---|
| Epoxy resin which is liquid at room temperature | Bisphenol type epoxy | LY1556 (Bisphenol A type epoxy resin) | — | 20 | 10 | 60 | — | — | — |
| | | GY282 (Bisphenol F type epoxy resin) | 20 | — | — | — | 60 | 50 | — |
| | [B] Polyfunctional amine type | MY0510 (Aminophenol type epoxy resin) | — | 30 | 40 | 40 | — | — | 50 |
| | | MY721 (Glycidyl amine type epoxy resin) | 40 | — | 10 | — | 40 | — | — |
| | | MY9665T (Glycidyl amine type epoxy resin) | — | — | — | — | — | — | — |
| [A] Epoxy resin which is solid at room temperature | EEW >300[g/eq] | GT7071 (Bisphenol type epoxy resin) | — | — | — | — | — | — | — |
| | | GT6084-2 (Bisphenol type epoxy resin) | — | — | — | — | — | — | — |
| | EEW ≤300[g/eq] | HP4710 (Bisnaphthalene type epoxy resin) | 40 | 50 | 40 | — | — | — | 50 |
| | | HP7200L (Dicyclopentadiene type epoxy resin) | — | — | — | — | — | 50 | — |
| Thermoplastic resin | | PES 2603 MP (Polyether sulfone) | 4 | 10 | 10 | 22 | 22 | 15 | 10 |
| Inorganic particle | [C] Clay mineral | Garamite 7305 (Organophilic phyllosilicates) | — | 8 | — | 4 | 4 | — | — |
| | | Garamite 1958 (Organophilic phyllosilicates) | 2 | — | — | — | — | 4 | — |
| | Fumed silica | Aerosil RY200 (Fumed silica) | — | — | — | — | — | — | 4 |
| Curing agent | Aromatic amine | Aradur 9664-1 ([[4-4']]4,4'-diaminodiphenylsulfone) | 32.3 0.9eq | 34.4 0.9eq | 44.7 0.9eq | 41.8 0.9eq | 44.0 0.9eq | — | 45.9 0.9eq |
| | | Aradur 9771--1 ([[4-4']]3,3'-diaminodiphenylsulfone) | — | — | — | — | — | 31.6 0.9eq | — |
| High-speed unwinding performance | | Surface state after unwinding | B | B | C | C | — | B | C |
| | | Width accuracy after unwinding (standard deviation of width [mm]) | 0.16 | 0.12 | 0.23 | 0.32 | — | 0.22 | 0.24 |
| Towpreg properties | | Tension for winding test of towpreg [N] | 4.6 | 3 | 5.8 | 2.0 | — | 4.1 | 5.3 |
| | | Spreadability for pressure deformation examination of towpreg [%] | 0.9 | 0.2 | 1.1 | 5.9 | — | 0.7 | 1.4 |
| | | Grass transition temperature after cure180° C./2 h [° C.] | 200 | 212 | 213 | 192 | — | 189 | 216 |
| | | Surface quality of towpre just after production | A | B | A | D | D | A | A |
| Resin properties | | Thixotropy coefficient at 60° C. ($\eta^*_{0.1\,Hz}/\eta^*_{10\,Hz}$) | 3.0 | 6.5 | 1.3 | 6.3 | 5.8 | 4.3 | 5.1 |
| | | 1 Hz storage modulus at 23° C. [Pa] | 4.0 | 59.3 | 3.5 | 1.0 | 3.3 | 6.0 | 3.3 |
| | | Grass transition temperature after cure 180° C./2 h [° C.] | 209 | 214 | 218 | 197 | 190 | 195 | 220 |

The invention claimed is:

1. A towpreg comprising a reinforcing fiber bundle aligned in one direction and impregnated with an epoxy resin composition, wherein the epoxy resin composition contains the following components [A] to [C]:
   [A] an epoxy resin which is solid at 23° C. in an amount of 30 parts or more in 100 parts by mass of total epoxy resin components,
   [B] a polyfunctional amine type epoxy which is liquid at 23° C. in an amount of 20 parts or more in 100 parts by mass of total epoxy resin components, and
   [C] organophilic phyllosilicates.

2. The towpreg according to claim 1, wherein the epoxy resin composition contains an epoxy resin which has an epoxy equivalent of 300 g/eq or less in an amount of 20 parts or more among the solid epoxy resin.

3. The towpreg according claim 1, wherein the epoxy resin composition has a polyfunctional amine type epoxy in an amount of 20 parts or more in 100 parts by mass of total epoxy resin components.

4. The towpreg according to claim 1, wherein the towpreg satisfies at least conditions [T1] to [T3] below:
   [T1] a tension is 5.0 N or less required when a sample obtained by winding 1.2 m of the towpreg on a bobbin having an outer diameter of 8.25 cm under a load of 9.8 N over 30 seconds is stored in an environment of 23° C./50 RH % for 5 days, and then unwound at 1.0 m/min;
   [T2] an extension of width of the towpreg is 3.0% or less when a sample in which the towpreg cut into 7.6 cm length is inserted between two of 2.6 cm×7.6 cm glass plates is stored in an environment of 23° C./50 RH % for 2 days in a state where a pressure of 2.48×103 Pa is applied to the glass plates in thickness direction; and
   [T3] a cured product obtained by curing the towpreg at 180° C. for 2 hours has a glass transition temperature of 180° C. or more.

5. The towpreg according to claim 1, wherein the epoxy resin composition satisfies conditions [R1] to [R3] below:
   [R1] a thixotropy coefficient ($\eta^*_{0.1\ Hz}/\eta^*_{10\ Hz}$) at 60° C. is 3.0 or more;
   [R2] a storage modulus at 1 Hz at 23° C. is $2.0 \times 10^5$ Pa or more; and
   [R3] a cured product obtained by curing the epoxy resin at 180° C. for 2 hours has a glass transition temperature of 180° C. or more.

6. The towpreg according to claim 4, wherein the cured product obtained by curing the towpreg at 180° C. for 2 hours has a glass transition temperature of 200° C. or more.

7. The towpreg according to claim 5, wherein the cured product obtained by curing the epoxy resin at 180° C. for 2 hours has a glass transition temperature of 200° C. or more.

8. The towpreg according to claim 1, wherein the epoxy resin composition contains an aromatic amine as a curing agent.

9. The towpreg according to claim 1, wherein the epoxy resin composition contains an epoxy resin which has at least one structure selected from the group consisting of a naphthalene skeleton, a dicyclopentadiene skeleton, a phenol aralkyl skeleton and a cresol novolac skeleton in an amount of 20 parts or more among the solid epoxy resin.

10. The towpreg according to claim 1, wherein the epoxy resin composition contains an epoxy resin which has an epoxy equivalent of 200 g/eq or less in an amount of 20 parts or more among the solid epoxy resin.

11. The towpreg according to claim 1, wherein the solid epoxy has a naphthalene skeleton.

12. The towpreg according to claim 1, wherein the solid epoxy has a dicyclopentadiene skeleton.

13. The towpreg according to claim 1, wherein the epoxy resin composition contains a thermoplastic resin.

14. The towpreg according to claim 1, wherein the thermoplastic resin is a polyether sulfone.

15. The towpreg according to claim 1, wherein the polyether sulfone has a weight average molecular weight of 30,000 g/mol or less.

16. The towpreg according to claim 1, wherein the polyfunctional amine type epoxy resin is an aminophenol type.

17. A fiber-reinforced composite material obtained by heating and curing a towpreg according to claim 1.

18. A manufactured article comprising or consisting of one or more fiber-reinforced composite materials according to claim 17.

19. The manufactured article according to claim 18, wherein the manufactured article is a composite material for aerospace applications or the aeronautic industry.

* * * * *